United States Patent
Aggarwal et al.

(10) Patent No.: US 10,193,799 B2
(45) Date of Patent: Jan. 29, 2019

(54) IN-ORDER MESSAGE DELIVERY IN A DISTRIBUTED STORE-AND-FORWARD SYSTEM

(71) Applicant: QUALCOMM Incorporated, San Diego, CA (US)

(72) Inventors: Ashutosh Aggarwal, San Diego, CA (US); Vijaykrishna Sadagopan, San Diego, CA (US); Sandip Bharati, San Diego, CA (US); Sunil Tiwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/390,235

(22) Filed: Dec. 23, 2016

(65) Prior Publication Data

US 2018/0026879 A1  Jan. 25, 2018

Related U.S. Application Data

(60) Provisional application No. 62/364,234, filed on Jul. 19, 2016.

(51) Int. Cl.
*H04L 29/08* (2006.01)
*H04L 12/721* (2013.01)
(Continued)

(52) U.S. Cl.
CPC .............. *H04L 45/44* (2013.01); *G06F 9/46* (2013.01); *H04L 51/00* (2013.01); *H04L 67/10* (2013.01);
(Continued)

(58) Field of Classification Search
CPC ....... H04L 45/44; H04L 67/10; H04L 67/145; H04L 67/1097; H04L 67/26;
(Continued)

(56) References Cited

U.S. PATENT DOCUMENTS 5,347,450 A  9/1994 Nugent
7,463,890 B2  12/2008 Herz et al.
(Continued)

FOREIGN PATENT DOCUMENTS

WO  2009126484 A2  10/2009

OTHER PUBLICATIONS

International Search Report and Written Opinion—PCT/US2017/037957—ISA/EPO—dated Oct. 4, 2017.

*Primary Examiner* — Kim T Nguyen
(74) *Attorney, Agent, or Firm* — Bala Ramasamy; Kilpatrick Townsend & Stockton

(57) ABSTRACT

Techniques described herein enable store-and-forward systems to hold data at source node (e.g., service platform) until they can be provided to the destination node e.g., user device). In other words, data can be buffered at the source node until the destination node is "online," and the establishment of a connection between the destination node and the intermediate node can trigger the retrieval of this data from the source node by the intermediate node. Additional techniques may be implemented to ensure the data connection between the intermediate node in the destination node does not expire while data is being communicated from the source node to the intermediate node.

28 Claims, 6 Drawing Sheets

(51) Int. Cl.
*H04L 12/58* (2006.01)
*G06F 9/46* (2006.01)
*H04L 29/06* (2006.01)

(52) U.S. Cl.
CPC ........ *H04L 67/1097* (2013.01); *H04L 67/145* (2013.01); *H04L 67/26* (2013.01); *H04L 69/08* (2013.01); *H04L 69/321* (2013.01); *H04L 51/14* (2013.01)

(58) Field of Classification Search
CPC . H04L 67/2852; H04L 67/2842; H04L 67/28; H04L 51/00; G06F 9/00; G06F 17/00; G06F 8/60
See application file for complete search history.

(56) References Cited

U.S. PATENT DOCUMENTS

| | | | |
|---|---|---|---|
| 7,536,167 B2 | 5/2009 | Gollnick et al. | |
| 8,838,635 B2 | 9/2014 | Mulligan et al. | |
| 8,990,563 B2 | 3/2015 | Blom et al. | |
| 2004/0103192 A1* | 5/2004 | Yli-Korhonen | H04M 15/00 709/224 |
| 2009/0307682 A1 | 12/2009 | Gharabally et al. | |
| 2010/0107150 A1 | 4/2010 | Kamada et al. | |
| 2013/0242763 A1* | 9/2013 | Li | H04W 24/02 370/252 |
| 2014/0282476 A1 | 9/2014 | Ciudad et al. | |
| 2015/0264627 A1 | 9/2015 | Perdomo | |
| 2017/0346726 A1* | 11/2017 | Menon | H04L 41/0668 |

* cited by examiner

IN-ORDER MESSAGE DELIVERY IN A DISTRIBUTED STORE-AND-FORWARD SYSTEM

RELATED APPLICATIONS

This application claims the benefit of U.S. Provisional Application No. 62/364,234, filed Jul. 19, 2016, entitled "IN-ORDER MESSAGE DELIVERY IN A DISTRIBUTED STORE-AND-FORWARD SYSTEM", which is assigned to the assignee hereof, and incorporated herein in its entirety by reference.

BACKGROUND

A distributed store-and-forward system is a data communication network comprising a plurality of network nodes in which information is sent from an originating or source node to an intermediate node. The data is then kept at the intermediate node and sent at a later time to the destination node. Oftentimes, the intermediate node will provide the data to the destination node once it is able to establish a connection with the destination node. This type of data distribution is used in a variety of contexts, such as in device-management systems in which the destination node is a wearable device (such as a smart watch) that may not always be communicatively connected with the distributed store-and-forward system.

Data distribution in traditional distributed store-and-forward systems, however, can be problematic at times. In certain circumstances, data (for the destination node) stored on one intermediate node may be different than data stored on another intermediate node, which may result in the destination node receiving outdated information.

SUMMARY

Techniques described herein enable store-and-forward systems to hold data at origination node (e.g., service platform) until they can be provided to the destination node e.g., user device). In other words, data can be buffered at the origination node until the destination node is "online," and the establishment of a connection between the destination node and the intermediate node can trigger the retrieval of this data from the origination node by the intermediate node. Additional techniques may be implemented to ensure the data connection between the intermediate node in the destination node does not expire while data is being communicated from the origination node to the intermediate node.

An example method of operating an intermediate node in a distributed store-and-forward system, according to the disclosure, comprises establishing, by the intermediate node, a first communication link with a destination node, where the first communication link comprises a first Open Systems Interconnection (OSI) model layer. The method further includes, while the first communication link with the destination node is established, sending a request from the intermediate node to an origination node, where: the request is for information to provide to the destination node, and the request is sent via a second communication link comprising a second OSI model layer different from the first OSI model layer. The method further includes receiving, by the intermediate node via the second communication link, a message to provide to the destination node and sending the message from the intermediate node to the destination node via the first communication link while the first communication link is established.

The method can further include one or more of the following features. The method can further include maintaining a session timer for the first communication link and sending a communication from the intermediate node to the destination node before the session timer indicates a threshold period of inactivity. The communication from the intermediate node can comprise a communication to read from a property of the destination node, write to a property of the destination node, or both. The second communication link can comprise a Transmission Control Protocol (TCP) connection. The first communication link can comprise a BLUETOOTH connection, a BLUETOOTH Low Energy (BLE) connection, a ZIGBEE connection, an IEEE 802.15.4 connection, an IEEE 802.11 connection, or a Near-Field Communication (NFC) connection, or any combination thereof. The second communication link can comprise an OSI model layer 3 or greater. The first communication link can comprise an OSI model layer 2.

An example electronic device, according to the disclosure can comprise a communication interface, a memory, and a processing unit communicatively coupled with the communication interface and the memory, where the processing unit is configured to cause the electronic device to establish, via the communication interface, a first communication link with a destination node, wherein the first communication link comprises a first Open Systems Interconnection (OSI) model layer. The processing unit is further configured to cause the electronic device to, while the first communication link with the destination node is established, send a request to an origination node via the communication interface, where the request is for information to provide to the destination node, and the request is sent via a second communication link comprising a second OSI model layer different from the first OSI model layer; The processing unit is further configured to cause the electronic device to receive, via the second communication link, a message to provide to the destination node; and send the message from the electronic device to the destination node via the first communication link while the first communication link is established.

The electronic device can include one or more of the following features. The processing unit may be further configured to cause the electronic device to maintain a session timer for the first communication link and send, via the communication interface, a communication to the destination node before the session timer indicates a threshold period of inactivity. The processing unit may be further configured to cause the electronic device to include, in the communication a message to read from a property of the destination node, write to a property of the destination node, or both. The processing unit may be further configured to cause the electronic device to establish the second communication link by establishing a Transmission Control Protocol (TCP) connection. The processing unit is further configured to cause the electronic device to establish the first communication link by establishing: a BLUETOOTH connection, a BLUETOOTH Low Energy (BLE) connection, a ZIGBEE connection, an IEEE 802.15.4 connection, an IEEE 802.11 connection, or a Near-Field Communication (NFC) connection, or any combination thereof. The second communication link may comprise an OSI model layer 3 or greater. The first communication link may comprise an OSI model layer 2.

An example apparatus, according to the disclosure, comprises means for establishing, by an intermediate node, a first communication link with a destination node, wherein the first communication link comprises a first Open Systems Interconnection (OSI) model layer. The apparatus further comprises means for, while the first communication link with the destination node is established, sending a request from the intermediate node to an origination node, where the request is for information to provide to the destination node, and the request is sent via a second communication link comprising a second OSI model layer different from the first OSI model layer. The apparatus further comprises means for receiving, via the second communication link, a message to provide to the destination node; and means for sending the message from the intermediate node to the destination node via the first communication link while the first communication link is established.

The apparatus can comprise one or more of the following features. The apparatus may comprise means for maintaining a session timer for the first communication link and means for sending a communication from the intermediate node to the destination node before the session timer indicates a threshold period of inactivity. The means for sending the communication from the intermediate node may comprise means for including, in the communication, a message to read from a property of the destination node, write to a property of the destination node, or both. The apparatus may comprise means for establishing the second communication link using a Transmission Control Protocol (TCP) connection. The means for establishing first communication link may comprise means for establishing a BLUETOOTH connection, a BLUETOOTH Low Energy (BLE) connection, a ZIGBEE connection, an IEEE 802.15.4 connection, an IEEE 802.11 connection, or a Near-Field Communication (NFC) connection, or any combination thereof. The second communication link may comprise an OSI model layer 3 or greater. The first communication link may comprise an OSI model layer 2.

An example non-transitory computer-readable medium, according to the description, can have instructions embedded therein for operating an intermediate node in a distributed store-and-forward system. The instructions comprise computer code for establishing, by the intermediate node, a first communication link with a destination node, wherein the first communication link comprises a first Open Systems Interconnection (OSI) model layer. The instructions comprise computer code for, while the first communication link with the destination node is established, sending a request from the intermediate node to an origination node, where the request is for information to provide to the destination node, and the request is sent via a second communication link comprising a second OSI model layer different from the first OSI model layer. The instructions comprise computer code for receiving, via the second communication link, a message to provide to the destination node and sending the message from the intermediate node to the destination node via the first communication link while the first communication link is established.

The non-transitory computer-readable medium can include one or more of the following features. The instructions may further comprise computer code for maintaining a session timer for the first communication link; and sending a communication from the intermediate node to the destination node before the session timer indicates a threshold period of inactivity. The instructions may further comprise computer code for including, in the communication, a message to read from a property of the destination node, write to a property of the destination node, or both. The instructions may further comprise computer code for establishing the second communication link using Transmission Control Protocol (TCP) connection. The instructions may further comprise computer code for establishing first communication link using a BLUETOOTH connection, a BLUETOOTH Low Energy (BLE) connection, a ZIGBEE connection, an IEEE 802.15.4 connection, an IEEE 802.11 connection, or a Near-Field Communication (NFC) connection, or any combination thereof. The second communication link may comprise an OSI model layer 3 or greater. The first communication link may comprise an OSI model layer 2.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Figure 1:
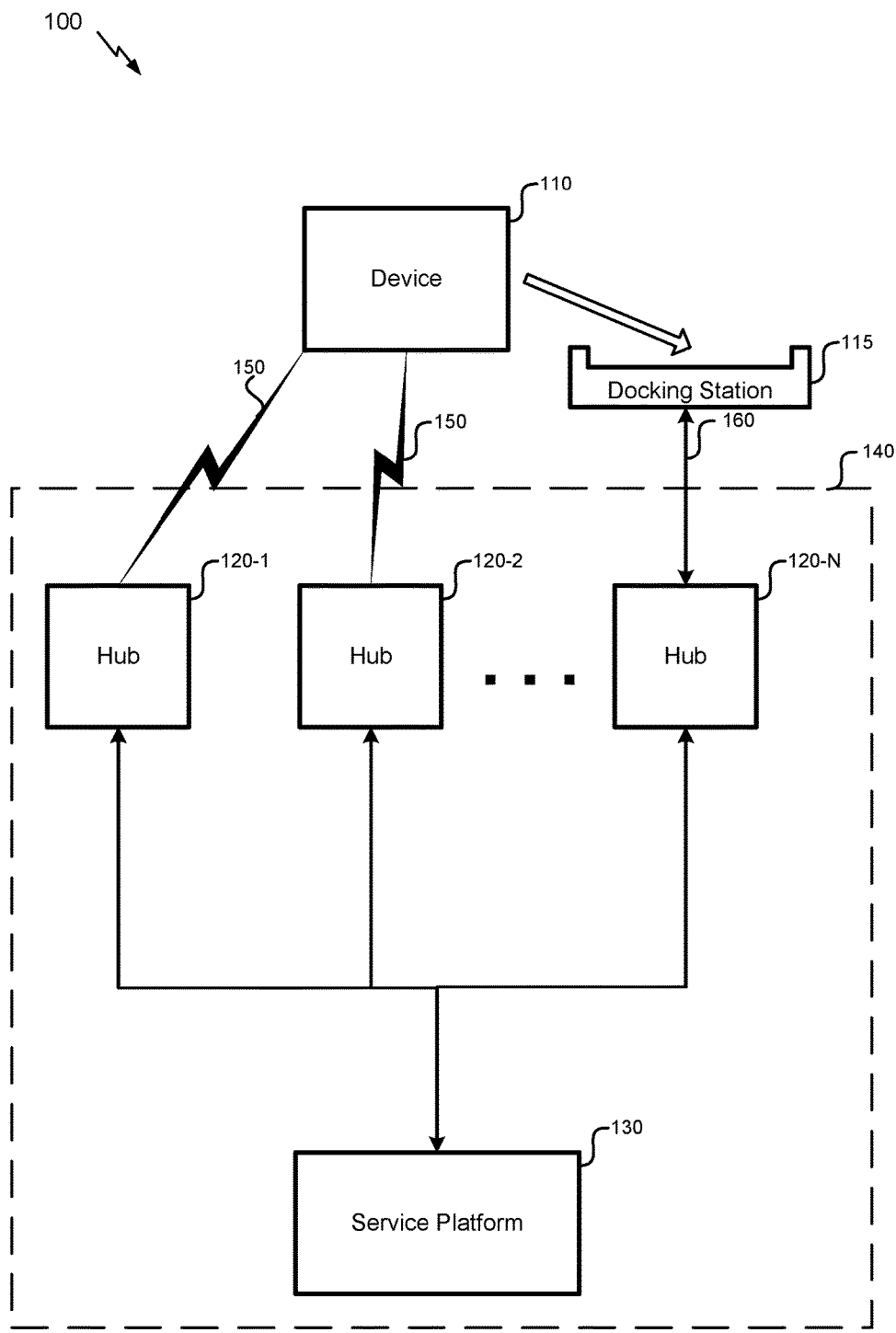
FIG. 1 is a block diagram of a distributed store-and-forward system, according to an embodiment.

FIG. 1 is a block diagram of an embodiment of a distributed store-and-forward system 100. As illustrated, the distributed store-and-forward system 100 can include a service platform 130, a plurality of hubs (120-1 to 120-N, or collectively referred to herein as hubs 120), and a device 110. It will be understood that alternate embodiments may include any of a variety of changes to the embodiment illustrated in FIG. 1. For example, a distributed store-and-forward system 100 may include more than one service platform 130, more than one device 110, and a larger or smaller number of hubs than illustrated in FIG. 1. The distributed store-and-forward system 100 may be utilized to manage the device 110 along with other devices (e.g., hundreds, thousands, millions, or more).

Here, the service platform 130 can comprise one or more computer servers configured to communicate information to and from end-user devices, such as device 110. This information can include software and/or other updates to be distributed among end-user devices, user information and/or input from the device 110, miscellaneous messages between the service platform 130 and the device 110, and the like. In the case of fitness trackers, for example, a user may provide the service platform 130 with an updated goal for the number of steps the user would like to achieve during a particular day (e.g., via an application on the user's mobile phone). The service platform 130 can then send a message with of this updated goal to the device 110 via the hubs 120.

Hubs 120 (also known as "gateway devices"), can comprise any of a variety of devices that can serve to communicate with both the service platform 130 and the device 110. These hubs 120 can include, for example, mobile phones, tablets, computers, dedicated communication devices (including mobile and/or fixed/immobile electronic devices within an enterprise), and/or other electronic devices.

The hubs 120 and the service platform 130 may be part of a larger network 140, such as a wide area network (WAN) or a wireless WAN (WWAN). This network can include a variety of smaller networks, including public and/or private networks, wired and/or wireless networks, secure and/or unsecure networks, and the like, and may include the Internet. The larger network 140 may enable devices to communicate with each other via any of a variety of technologies such as radio frequency (RF), optical, wired electrical, and/or other communications.

The hubs 120 and the service platform 130 can communicate with each other using any of a variety of governing network protocols. In some embodiments, for example, the hubs 120 and the service platform 130 communicate using end-to-end Transmission Control Protocol (TCP). That is, in communications between the service platform 130 and the hubs 120, the Internet protocol (IP) termination is at the hubs 120. Communication between the hubs 120 and the service platform 130 traditionally employ pull-type communications in which the hubs 120 will each periodically communicate with the service platform 130 and download any new information from the service platform 130 to provide to the device 110. In some systems, the service platform 130 may provide an indication to the hubs 120 that it has new information to be propagated to the device 110 that the hubs 120 may need to fetch. A hub 120 will propagate the information to the device 110 once the device 110 connects to the hub 120.

The device 110 can comprise any of a variety of electrical devices capable of communicating with the hubs 120. This can include connected or semi-connected wearable devices (i.e., fitness trackers, activity trackers, smart watches, and other such electronic devices worn by a user), personal electronic devices, home automation devices and other devices within the Internet of Things (IoT), and the like. The device 110 can communicate with the hubs 120 using wireless communication links 150, allowing for mobility of the device 110. While moving, the device 110 can establish wireless communication links 150 with hubs 120 newly within its proximity and end wireless communication links 150 with hubs 120 that are no longer within its proximity.

Additionally or alternatively, the device 110 may communicate with one or more hubs 120 via a wired connection 160. For example, a docking station 115 of the device 110 may be connected with the one or more hubs 120 via a wired connection 160 that can be used by the device 110 when the device is physically docked with the docking station 115. Additionally or alternatively, in some embodiments, a docking station 115 may serve as a hub 120 and/or vice versa. To the degree it is applicable, the functionality described herein with regard to wireless communication links 150 can be performed by the wired connection 160.

In can be noted that as used herein, the term "communication link" can refer to both wireless and wired communications. Moreover, it may further refer to a data communication session in which communication may be transferred. As such, ending a "communication link" may comprise terminating a data communication session in accordance with governing protocol(s) and/or standard(s).

In general, a store-and-forward system utilizes a different Open Systems Interconnection (OSI) model layer for enabling the service platform 130 to communicate with the hubs 120 than the layer used for communications between the hubs 120 and the device 110. As previously mentioned, information may be delivered from the service platform 130 to the hubs 120 using a TCP connection. More broadly, the communication between the service platform 130 and the hubs 120 may be carried out primarily using OSI model layer 3 or greater. On the other hand, wireless communication links 150 and/or wired connection 160 between the hubs 120 and the device 110 can be established using any of a variety of wireless technologies at the OSI model layer 2 (data link layer) including, but not limited to, Bluetooth®, Bluetooth® Low Energy (BLE), ZIGBEE, IEEE 802.15.4, IEEE 802.11, Wi-Fi, Long Term Evolution Direct (LTE-D), near-field communication (NFC), Ethernet, and the like. The wireless communication links 150 and/or wired connection 160 between the hubs 120 and the device 110 may not include OSI model layer 3 and above.

In traditional systems, this can be problematic because hubs 120 may only periodically receive information from the service platform 130, and one hub may have a different periodicity and/or may not be synchronized with another hub, which can lead to the hubs 120 providing the device 110 with old or expired information from the service platform 130.

For example, a first hub 120-1 may periodically receive information from the service platform 130 every four hours, and a second hub 120-2 may periodically receive information from the service platform 130 every 12 hours. At a first time, T1, both the first hub 120-1 and the second hub 120-2 may receive and original message from the service platform and store it until it has the opportunity to forward the message to the device 110. Subsequently, a wireless communication link 150 is established between the first hub 120-1 and the device 110, the first hub 120-1 forwards the original message to the device 110. Four hours later, at time T2, the first hub 120-1 may receive an updated message that it provides to the device 110. But, because the second hub 120-2 has not yet received the updated message, if the device 110 subsequently establishes a wireless communication link 150 to the second hub 120-2, the second hub 120-2 will provide the original message to the device 110, potentially overwriting the updated message and providing the device 110 with old, perhaps obsolete information. Because the hubs 120 update at different times with different periodicity, and because the periodicity may be relatively infrequent (hours or so between updates), these types of situations may arise frequently where the device 110 is moving between hubs 120 and establishing (and ending) wireless communication links 150 with them.

It can be noted that push-type notification systems in which the service platform 130 sends messages to the hubs 120 to provide to the device 110 may also be vulnerable to providing the device 110 with outdated information in certain circumstances. For example, a mobile hub 120 may not be able to receive a push-type message from the service platform 130 for any of a variety of reasons (such as lack of Internet connectivity, temporarily turned off, and the like). In such a case the mobile hub 120 may provide the device 110 with outdated information.

Thus, either pulling or pushing messages to the hubs 120 in a traditional store-and-forward system 100 can present situations in which a hub 120 provide to device 110 with outdated information. The operation of the device 110 may be negatively impacted through the use of this outdated information.

Techniques described herein can address this problem in distributed store-and-forward systems (such as the distributed store-and-forward system 100 of FIG. 1) by holding messages at the service platform 130 until they can be provided to the device 110. In other words, messages are buffered at the service platform until the device is "online," and the establishment of a connection between the device and the hub triggers the retrieval of this message from the service platform 130 by the hub 120. This is contrary to traditional techniques for managing a store-and-forward system, which tend to push information to the edge of the network.

Figure 2:
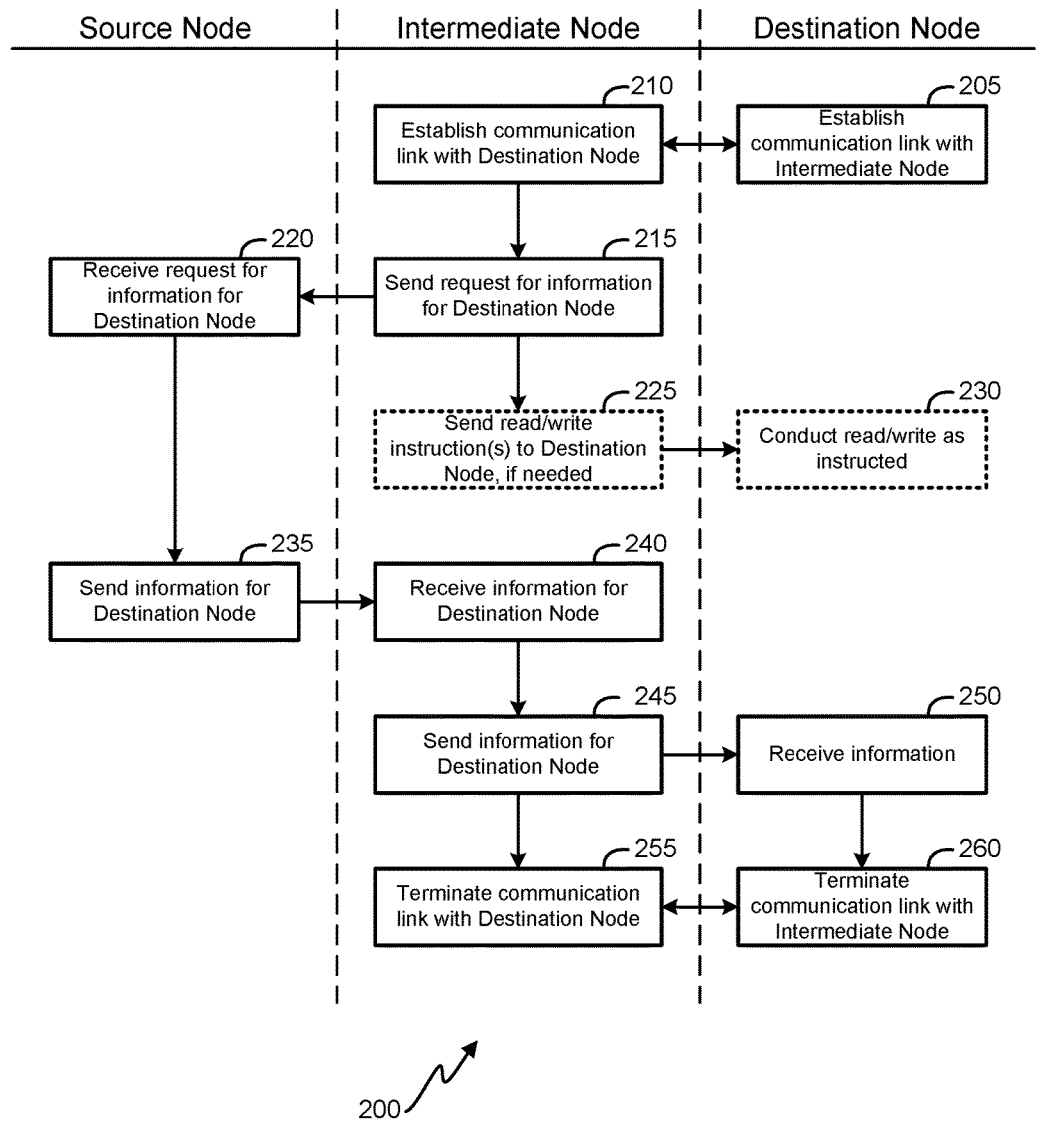
FIG. 2 is a swim lane diagram illustrating an embodiment of a technique of data distribution, according to an embodiment.

FIG. 2 is a swim lane diagram 200 illustrating an embodiment of this technique. Here, because the techniques herein do not necessarily have to be limited to the embodiments with a service platform, hubs, and/or a device of a device-management system (such as the distributed store-and-forward system 100 of FIG. 1), components have been generalized as a "origination node" (e.g., corresponding to the service platform 130 of FIG. 1), "intermediate node" (e.g., corresponding to a hub 120), and destination node (corresponding to a device 110). As such, it will be understood that embodiments may be utilized in a variety of distributed store-and-forward systems in a variety of applications.

The process can begin at blocks 205 and 210 where a communication link is established between the destination node in the intermediate node. This communication link can be, for example, a data communication session via Bluetooth®, Bluetooth® Low Energy (BLE), ZIGBEE, IEEE 802.15.4, IEEE 802.11, Wi-Fi, Long Term Evolution Direct (LTE-D), near-field communication (NFC), and/or other wireless technologies at the OSI model layer 2. Depending on desired functionality, the establishment of this communication link may be automatic, based on the destination node coming within wireless communication range of the intermediate node (or possibly vice versa). Additionally or alternatively, the communication link may be established, when possible, based on a schedule, determined periodicity, triggering event, and/or other factor(s). Moreover, the communication link may be an encrypted or otherwise secure session, in which case establishing the communication link may involve exchanging an encryption key, a security certificate, and/or performing other types of authentication. For embodiments utilizing wired technologies, the communication link may be established when the destination node is physically connected to the intermediate node or a docking station.

At block 215, the intermediate node sends a request for information for the destination node. Here, the request may be triggered by the establishment of the communication link between the intermediate node in the destination node. Furthermore, in some embodiments, the intermediate node may have received information from the origination node that the origination node has information for the destination node (e.g., the origination node may have "pushed" a message to the intermediate node indicating that new information was available for the destination node), in which case the intermediate node sends a request for that information. The request for the information for the destination node is received by the origination node at block 220.

Figure 3:
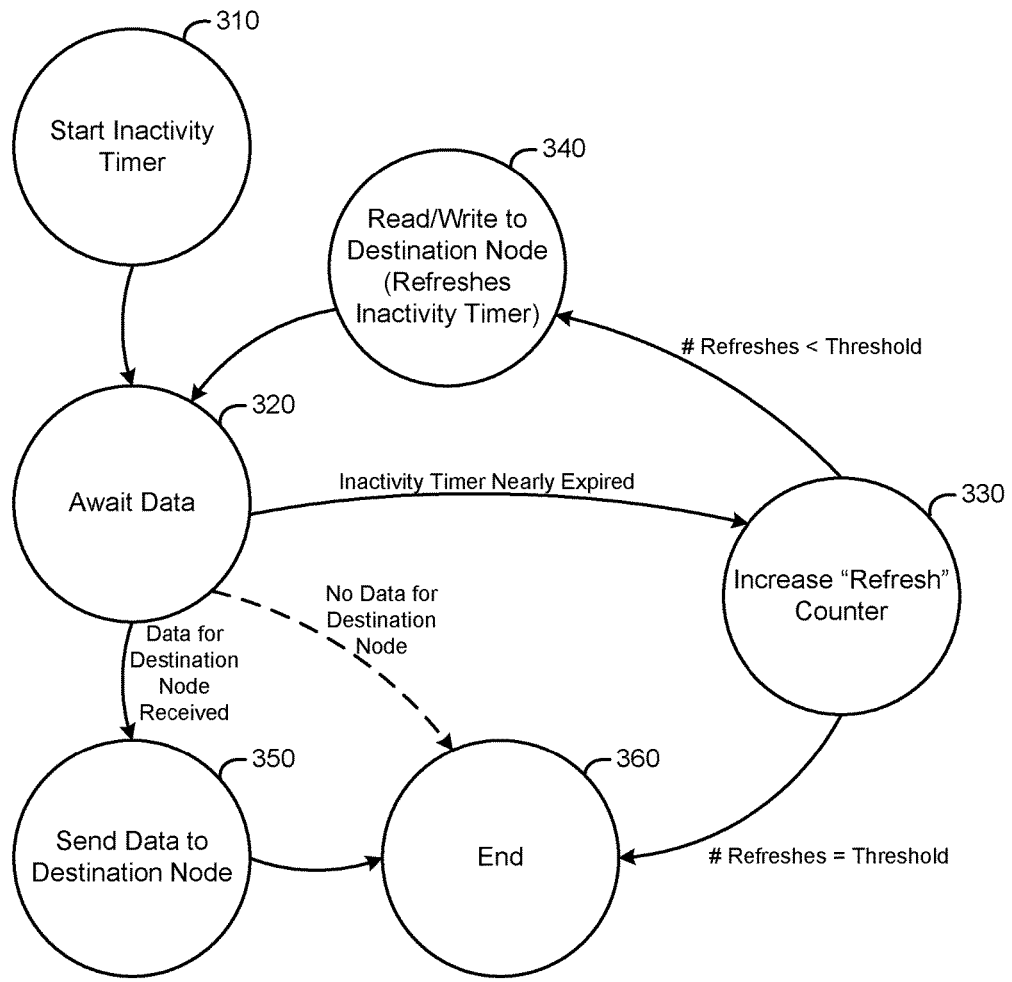
FIG. 3 is a state machine diagram that illustrates the functionality that an intermediate node may perform to maintain the communication link with the destination node, according to an embodiment.

According to some embodiments, the intermediate node and destination node may optionally perform operations to ensure that the communication link established between the intermediate node in the destination node at blocks 205 and 210 is refreshed. Specifically, once the communication link is established, a session timer may require that the intermediate node sends information to the destination node within a threshold amount of time before the session times out. To help ensure that the session does not timeout, at block 225, the intermediate node may send one or more read and/or write instructions to the destination node, in which case the destination node can conduct the requested read and/or write operations at block 230. The intermediate node may perform the functionality of block 225 before the session timer expires and the session times out. It can be noted that, in some embodiments, instructions and/or operations other than reading and/or writing may be performed, which may depend on various factors such as the device type(s) of the intermediate node and/or destination node, the wireless technology used, any applicable governing standards and/or protocols, and/or the like. The intermediate node may perform the functionality of block 225 multiple times to ensure the communication link is refreshed, depending on how soon the origination node responds with the information for the destination node. Additional details regarding this functionality is shown in FIG. 3 and described in more detail below.

At block 235, the origination node sends the information for the destination node to the intermediate node, which is received by the intermediate node at block 240. As previously noted, the information for the destination node a comprise any of a variety of things, depending on desired functionality. In some embodiments, for example, the information for the destination node may comprise a message for a user of the destination node, a firmware or other software update for the destination node, a request for information from the destination node, and/or other type of information.

At block 245, the intermediate node sends the information for the destination node, which is received by the destination node at block 250. Then at blocks 255 and 260 the intermediate node and destination node respectively terminate the communication link (established at blocks 210 and 205). Again, depending on the type of communication link established, this may simply mean communicating one or more messages indicating the termination of a communication session.

The process shown in FIG. 2 may comprise additional or alternative functions, depending on desired functionality. In some embodiments, for example, when the information for the destination node is successfully provided to the destination node by the intermediate node, the intermediate node can send a message to the origination node indicating that the destination node successfully received the information. This functionality may be triggered by the destination node sending the intermediate node a confirmation of successful receipt of the information.

Additionally or alternatively, as noted above, the functionality provided at blocks 225 and 230 is optional and may be performed to help ensure the communication link between the intermediate node in the destination node does not timeout during the period of time that the intermediate node is waiting to receive the information for the destination node from the origination node. Other techniques to maintain the communication link between the intermediate node in the destination node may be performed additionally or alternatively.

FIG. 3 is a state machine diagram 300 that illustrates the functionality that an intermediate node may perform to maintain the communication link with the destination node, according to an embodiment. A person of ordinary skill in the art will recognize that alternative embodiments may add to, omit from, and/or rearrange the illustrated functions shown in FIG. 3, depending on desired functionality. For example, there may be many other instances in which the intermediate node may enter the end state 360, stopping the process of maintaining the communication link (e.g., in cases where the intermediate node is unable to perform the functionality at one or more other states in the state machine diagram 300).

The process can begin at state 310, where an inactivity timer is started. Here, the inactivity timer may reflect a period of time in which the intermediate node is to provide the destination node with information before a data communication session between the intermediate node and the destination node at times out. In other words, the inactivity timer may be established when a communication link between the intermediate node and destination node is established (e.g., at blocks 205 and 210 of FIG. 2), and may indicate a time in which the communication link may expire unless refreshed. This period of time (which is typically on the order of seconds; e.g., 3, 5, 10, 12 s, etc.) may be governed by applicable standards and/or protocols, which can vary depending on the type of communication between the intermediate node in the destination node (e.g., BLE, Wi-Fi®, etc.), the device type of the destination node, and/or other factors.

As shown, after starting the inactivity timer at state 310, the intermediate node may then move into state 320, where it awaits data from the origination node. As shown in FIG. 2, the intermediate node may perform other functions during this period of time (unrelated to maintaining the communication link as shown by the state machine diagram 300 in FIG. 3). This can include sending a request to the origination node for information for the destination node (as shown in block 215 of FIG. 2). The intermediate node can then remain in this state 320 until the data is received from the origination node or the inactivity timer is nearly expired.

As previously noted, the techniques provided herein can be utilized in embodiments that use either "push" or "pull" data distribution mechanisms. In the former case, the origination node can send information to the intermediate node indicating that the origination node has data for the destination node. In the latter case, however, the intermediate node may request information from the origination node at times (e.g., after the intermediate node establishes a communication link with the destination node) when the origination node may not have data for the destination node. In such cases, the origination node may reply to the intermediate node that it does not have data for the destination node, in which case the destination node can simply move to an end state 360 (exiting the process of maintaining the communication link with the destination node), as shown in FIG. 3.

While in the state 320 waiting for data from the origination node, the intermediate node can begin the process of "refreshing" the communication link with the destination node when the inactivity timer is nearly expired. Here, the term "nearly expired" can mean that the inactivity timer is within a threshold period of time before the inactivity timer expires in the session times out. This threshold period of time can vary, depending on desired functionality, governing standards and/or protocols, communication technology involved, and/or other factors. Ultimately, the threshold period of time may be a predetermined period of time that allows for the communication link between the intermediate node and the origination node to be refreshed before it expires, if necessary. That is, the threshold period of time can be predetermined to allow the intermediate node to perform the functions shown in states 330 and 340 to refresh the communication link, if needed.

Initially, when the intermediate node determines that the inactivity timer is nearly expired, it can enter a state 330 in which it increases a "refresh" counter. Here, the "refresh" counter can simply be a counter that tracks a number attempts made by the intermediate node to refresh the communication link between the intermediate node and the destination node. If a threshold number of refreshes is attempted (without receiving data from the origination node for the destination node), then the intermediate node can enter the end state 360 and stop attempting to maintain the communication link with the destination node. (Again, this threshold may be a number that is predetermined based on desired functionality, governing protocol(s), etc.)

If the threshold number of refreshes has not been met, the intermediate node will then move to a state 340 in which it reads and/or writes to the destination node, thereby refreshing the communication link and the associated inactivity timer. Such reading and/or writing can be associated with the property of the destination node. In embodiments that employee BLE wireless technology, for instance, the intermediate node may read or write to a BLE "characteristic" of the destination node. This can comprise, for example, setting the time of the destination node.

After performing the functionality at state 340, the intermediate node can then reenter state 320 in which it continues to await for data from the origination node. The intermediate node can repeat the functionality at states 330 and 340 multiple times (as long as the number of refreshes in the refresh counter is less than the threshold), refreshing the communication link and buying additional time for the origination node to provide the data for the destination node.

If the intermediate node receives the data for the destination node while in the state 320, the intermediate node can then move to the state 350 in which it sends the data to the destination node. After the data is successfully sent, the intermediate node can then enter the end state 360.

In some embodiments, the intermediate node may make a threshold number of attempts to send the data to the destination node before entering the end state 360. If successful, the intermediate node may then enter the end state 360. If unsuccessful, the intermediate node may, before entering the end state 360, send a message to the origination node indicating that the data was not sent to the destination node. Embodiments may employ additional or alternative contingency mechanisms in the same manner (as they may relate to other states shown in the state machine diagram 300), depending on desired functionality.

Figure 4:
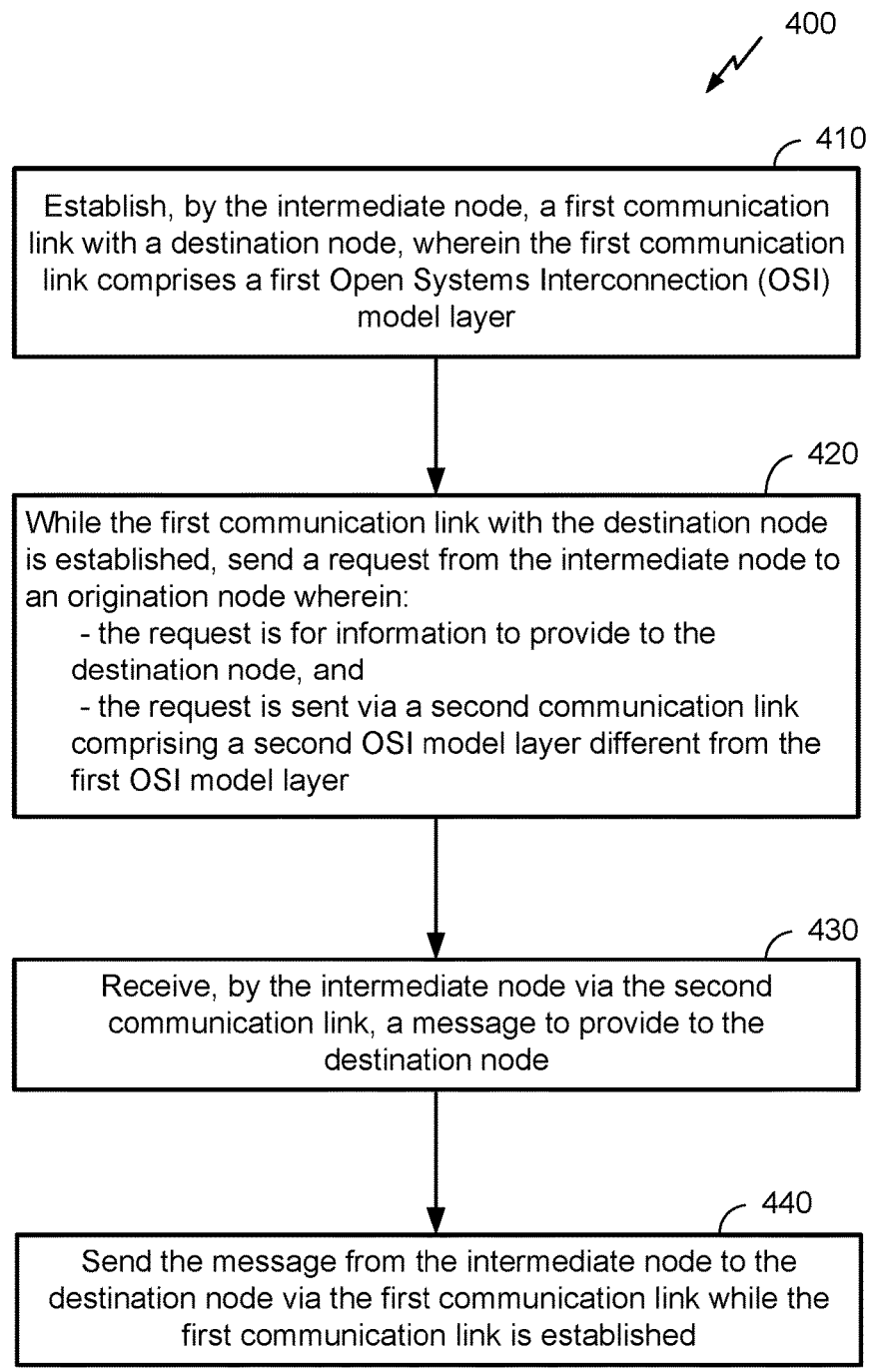
FIG. 4 is a flow diagram of a method for providing in-order message delivery in a distributed store-and-forward system, according to one embodiment.

FIG. 4 is a flow diagram 400 illustrating an embodiment of operating an intermediate node in a distributed store-and-forward system, according to the techniques described herein. As with other figures provided herein, the embodiment provided in FIG. 4 is a non-limiting example. A person of ordinary skill in the art will recognize alternative embodiments may employ any of a number of variations. Any or all of the functions illustrated in the boxes of FIG. 4 can be performed by an intermediate node of the previously-described embodiments (including any or all of the plurality of hubs 120 of FIG. 1), although alternative embodiments may enable additional or alternative destination nodes to perform some or all of the functions. Means for performing the functions of any or all of the blocks shown in FIG. 4 can comprise software and/or hardware components of a mobile device (such as the electronic device 500 shown in FIG. 5 and described in further detail below) and/or a computer (such as the computer 600 shown in FIG. 6 and described in further detail below).

At block 410, a first communication link with the destination node is established, where the first communication link comprises a first OSI model layer. As previously noted, the destination node can be mobile and therefore may establish a wireless connection (e.g., a wireless communication link 150) with an intermediate node, e.g. when within a threshold proximity of the intermediate node. As previously indicated, any of a variety of OSI model layer 2 (data link layer) wireless technologies and/or wired technologies can be used, which may depend on the type of physical layer (OSI model layer 1) used. And the connection may be established in accordance with governing protocols and may be initiated by either the intermediate node or the destination node. Such OSI model layer 2 protocols can comprise, for example, Ethernet, Wi-Fi, WiMAX, point-to-point protocol (PPP), and the like. At this point, the intermediate node may not have any messages from the origination node to provide to the device 110.

Figure 5:
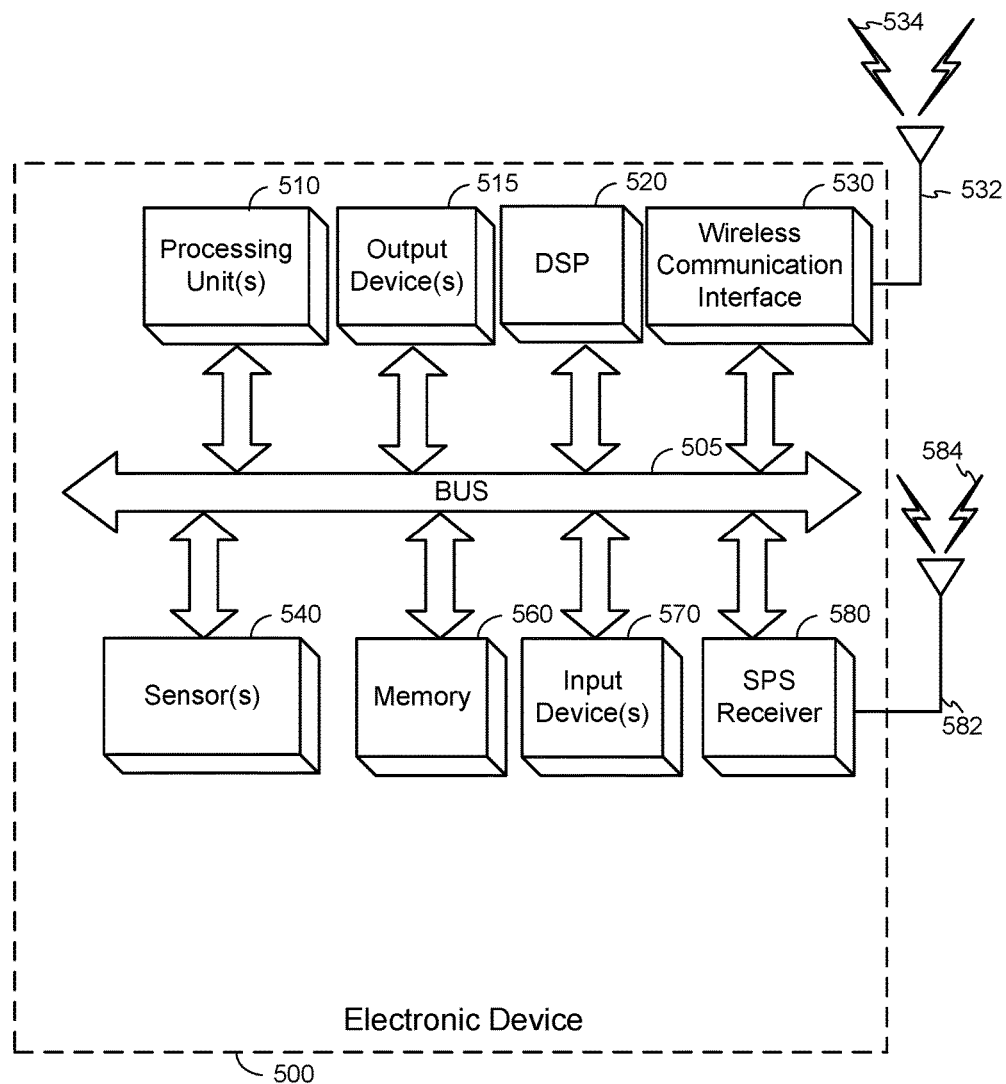
FIG. 5 is a block diagram that illustrates an embodiment of an electronic device.
Figure 6:
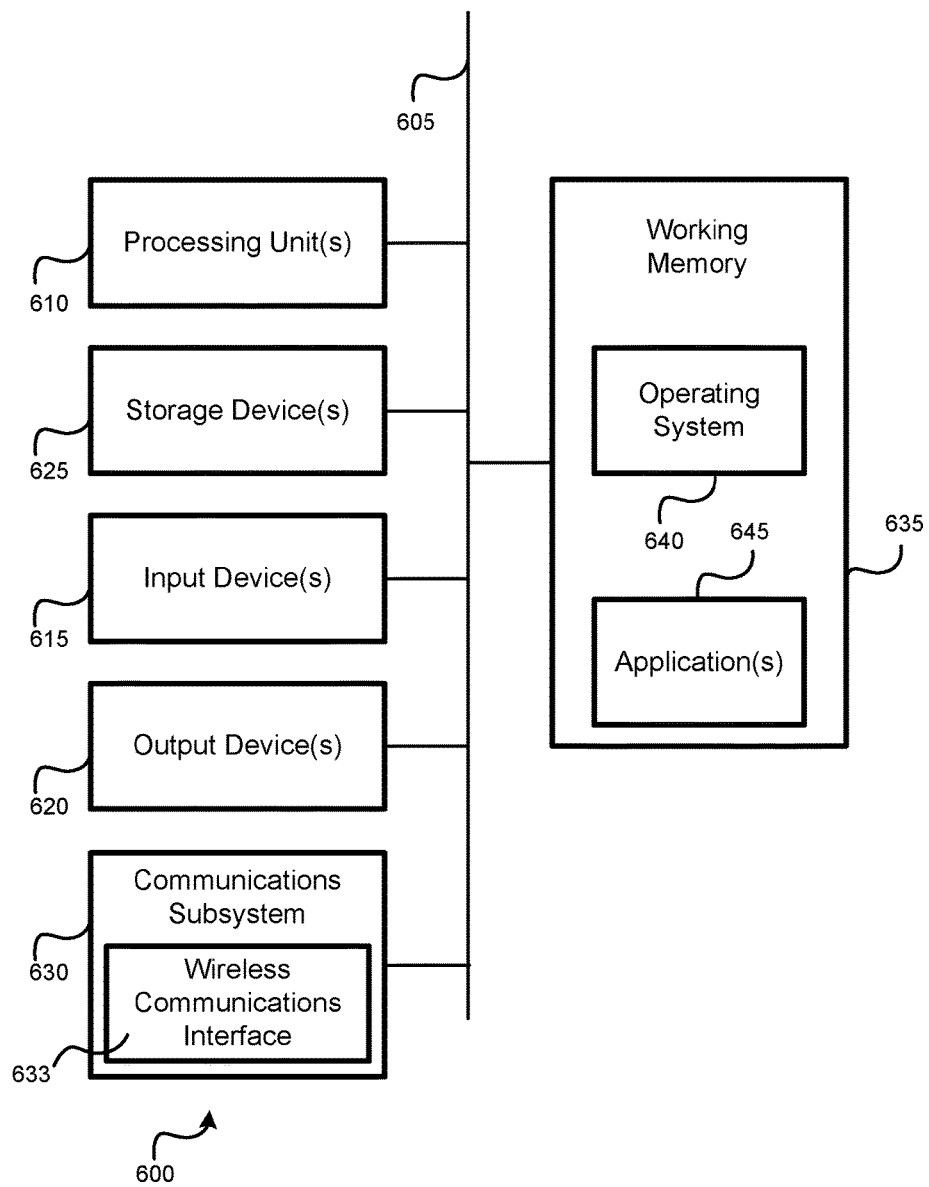
FIG. 6 is a block diagram that illustrates an embodiment of a computer.

Means for performing the functionality at block 410 can include the processing unit(s) 510, wireless communication interface 530, bus 505, and/or memory 560 of an electronic device 500, as shown in FIG. 5 and described below. Additionally or alternatively, means for performing the functionality at block 410 can include the processing unit(s) 610, communications subsystem 630 and/or wireless communications interface 633, bus 605, and/or working memory 635 of a computer 600, as shown in FIG. 6 and described below.

At block 420, while the first communication link with the destination node is established a request is sent to the origination node, where the request is for information to provide to the destination node, and the request is sent via a second communication link comprising a second OSI model layer different from the first OSI model layer. In some embodiments, the request may be a "fetch" message. In some embodiments, the request may include information regarding the destination node to help the origination node determine whether a message is needed. This information may include information regarding a firmware or operating system version number, an identification code of the destination node, and/or other information that may be utilized by the origination node to determine whether a message is to be sent to the destination node.

Here, the different OSI model layers involved in the first communication link and the second communication link may reflect the different types of technologies involved. For example, communication between the intermediate and origination nodes over the second communication link may be sent via TCP/IP messaging (OSI model layer 3) where each node has a distinct IP address. Communication between the intermediate and destination nodes, on the other hand, may be governed by protocol and/or standards related to OSI model layer 2 (where, for example, neither node has an IP address shared in the communication), without including OSI model layer 3 and above.

Means for performing the functionality at block 420 can include the processing unit(s) 510, wireless communication interface 530, bus 505, and/or memory 560 of an electronic device 500, as shown in FIG. 5 and described below. Additionally or alternatively, means for performing the functionality at block 420 can include the processing unit(s) 610, communications subsystem 630 and/or wireless communications interface 633, bus 605, and/or working memory 635 of a computer 600, as shown in FIG. 6 and described below.

At block 430, the intermediate node receives, via the second communication link, a message to provide to the destination node. This message can, for example, include the requested information for the destination node. As noted above, the message can include a software update for the destination node, data that may impact the functionality of the destination node, and the like.

Finally, at block 440, the message is sent from the intermediate node to the destination node via the first communication link while the first communication link is established. The intermediate node and the destination node may then terminate a communication session and/or otherwise end the first communication link.

Means for performing the functionality at blocks 430 and/or 440 can include the processing unit(s) 510, wireless communication interface 530, bus 505, and/or memory 560 of an electronic device 500, as shown in FIG. 5 and described below. Additionally or alternatively, means for performing the functionality at blocks 430 and/or 440 can include the processing unit(s) 610, communications subsystem 630 and/or wireless communications interface 633, bus 605, and/or working memory 635 of a computer 600, as shown in FIG. 6 and described below.

Any of a variety of alterations may be made to the basic functionality illustrated in FIG. 4, depending on desired functionality. For example, as previously indicated, some embodiments may employ techniques to ensure the connection between the intermediate node and the destination node established at block 410 does not timeout (e.g., the inactivity timer expires) before the intermediate node receives the message from the origination node and provides it to the destination node.

In some embodiments, the functionality described in FIG. 4 may only be employed with certain types of messages. For example, a store-and-forward system (such as the distributed store-and-forward system 100 of FIG. 1) may employ traditional store-and-forward functionality with regard to most messages provided from the origination node to the destination node. However, for certain messages (such as those that have been flagged as important or otherwise identified as causing detrimental effect to the destination node if not received in order) the store-and-forward system may perform the functionality illustrated in FIG. 4. In some embodiments, an origination node may identify these messages by communicating this information to the intermediate nodes.

In some embodiments, after the functionality at block 440 has been performed, the intermediate node may receive an acknowledgment from the destination node that the message has been received. The intermediate node may then provide the origination node with an acknowledgment or some other indication that the message has been delivered to the device. This end-to-end acknowledgement enables the origination node to keep track of the messages that have been delivered to the destination node so that, if the destination node subsequently comes "online," the origination node would not need to deliver the message again.

Alternatively, if the intermediate node does not receive an acknowledgment from the destination node, the intermediate node may provide a "failure" message to the origination node, indicating that the message has not been successfully delivered. In such instances, the origination node may subsequently try to redeliver the message when the destination node again becomes "online." In some embodiments, the intermediate node may try to deliver the message to the destination node at least a predetermined number of times before reporting the "failure" message to the origination node.

It can be noted that, although embodiments provided herein are described in relation to store-and-forward systems, the techniques disclosed may be used in other types of technology systems and platforms, using any of a variety of wireless and/or wired communication technologies.

FIG. 5 illustrates an embodiment of an electronic device 500, which can be utilized as one or more types of nodes in a distributed store-and-forward (or similar) system, as described in the embodiments provided herein. For example, the device 110 and/or hubs 120 of FIG. 1 may comprise some or all of the components illustrated in the electronic device 500 of FIG. 5, depending on desired functionality. (In some embodiments, for example, the device 110 may have far fewer components than the hubs 120.) That is FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations. The apparatus may be configured to execute one or more functions of the methods described herein, such as the methods corresponding to FIGS. 2-4.

The electronic device 500 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The electronic device 500 also may comprise one or more input devices 570, which may comprise without limitation one or more touch screens, touch pads, microphones, buttons, dials, switches, and/or the like; and one or more output devices 515, which may comprise without limitation, one or more displays, light emitting diode (LED)s, speakers, and/or the like.

The electronic device 500 might also include a wireless communication interface 530, which may comprise without limitation a modem, a network card, an infrared communication device, a wireless communication device, and/or a chipset (such as a Bluetooth (or BLE) device, an IEEE 802.11 device, an IEEE 802.15.4 (or ZIGBEE) device, a WIFI device, a WiMAX device, cellular communication facilities, etc.), and/or the like. The wireless communication interface 530 may permit data to be communicated with a network, a location server, wireless access points, other computer systems, and/or any other electronic devices described herein (e.g., the device, hubs, and/or service platform). The communication can be carried out via one or more wireless communication antenna(s) 532 that send and/or receive wireless signals 534.

Depending on desired functionality, the wireless communication interface 530 may comprise separate transceivers to communicate with different devices, which may be on different networks. (For example, an intermediate node may use first and second transceivers to communicate with the destination node and the origination node, respectively.) These different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The electronic device 500 can further include sensor(s) 540. Such sensors may comprise, without limitation, one or more accelerometer(s), gyroscope(s), camera(s), magnetometer(s), altimeter(s), microphone(s), proximity sensor(s), light sensor(s), and the like. Such sensors may, for example, be utilized in the device 110 of FIG. 1 to provide features such as activity tracking and the like, depending on desired functionality.

Embodiments of the electronic device 500 may also include a satellite positioning system (SPS) receiver 580 capable of receiving signals 584 from one or more SPS satellites using an SPS antenna 582. Such positioning can be utilized to complement and/or incorporate the techniques described herein. The SPS receiver 580 can extract a position of the semi-connected mobile device, using conventional techniques, from SPS satellite vehicles (SVs) of an SPS system, such as GNSS (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 580 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The electronic device 500 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 560 may be used to store the messages and/or other information sent to/from the service platform and the device, as described herein, which can be implemented using a database, linked list, or any other type of data structure. Additionally or alternatively, the messages and/or other information may be stored in a separate memory utilized by dedicated hardware for data collection.

The memory 560 of the electronic device 500 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the electronic device 500 (and/or a processing unit within an electronic device 500). In an aspect, then, such code and/or instructions can be used to configure and/or adapt a general purpose computer (or other device) to perform one or more operations in accordance with the described methods.

FIG. 6 illustrates an embodiment of a computer system 600, which may comprise or be incorporated, at least in part, into devices described herein, such as one or more node types in a distributed store-and-forward system (e.g., hubs 120 and/or service platform 130 of FIG. 1). FIG. 6 provides a schematic illustration of one embodiment of a computer system 600 that can perform methods of the previously-described embodiments, such as the method of FIG. 2. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 600 also may comprise one or more input devices 615, which may comprise without limitation a mouse, a keyboard, a camera, a microphone, and/or the like; and one or more output devices 620, which may comprise without limitation a display device, a printer, and/or the like.

The computer system 600 may further include (and/or be in communication with) one or more non-transitory storage devices 625, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 600 might also include a communications subsystem 630, which may comprise wireless communication technologies managed and controlled by a wireless communication interface 633, as well as wired technologies (such as Ethernet, coaxial communications, universal serial bus (USB), and the like). As such, the communications subsystem may comprise a modem, a network card (wireless or wired), an infrared communication device, a wireless communication device, and/or a chipset (such as a Bluetooth device, an IEEE 802.11 device, an IEEE 802.15.4 device, a WiFi device, a WiMax device, cellular communication facilities, ultra wide band (UWB) interface, etc.), and/or the like. The communications subsystem 630 may include one or more input and/or output communication interfaces, such as the wireless communication interface 633, to permit electronic device 500 of FIG. 5), other computer systems, and/or any other electronic devices described herein. Hence, the communications subsystem 630 may be used to receive and send data as described in the embodiments herein.

In many embodiments, the computer system 600 will further comprise a working memory 635, which may comprise a RAM or ROM device, as described above. Software elements, shown as being located within the working memory 635, may comprise an operating system 640, device drivers, executable libraries, and/or other code, such as one or more applications 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of operating an intermediate node in a distributed store-and-forward system, the method comprising:

establishing, by the intermediate node, a first communication link with a destination node, wherein the first communication link comprises a first Open Systems Interconnection (OSI) model layer;
while the first communication link with the destination node is established, sending a request from the intermediate node to an origination node, wherein:
the request is for information to provide to the destination node, and
the request is sent via a second communication link comprising a second OSI model layer different from the first OSI model layer;
receiving, by the intermediate node via the second communication link, a message to provide to the destination node; and
sending the message from the intermediate node to the destination node via the first communication link while the first communication link is established.

2. The method of claim 1, further comprising:
maintaining a session timer for the first communication link; and
sending a communication from the intermediate node to the destination node before the session timer indicates a threshold period of inactivity.

3. The method of claim 2, wherein the communication from the intermediate node comprises a communication to:
read from a property of the destination node,
write to a property of the destination node,
or both.

4. The method of claim 1, wherein the second communication link comprises a Transmission Control Protocol (TCP) connection.

5. The method of claim 1, wherein the first communication link comprises:
a BLUETOOTH connection,
a BLUETOOTH Low Energy (BLE) connection,
an LTE-D connection,
a ZIGBEE connection,
an IEEE 802.15.4 connection,
an IEEE 802.11 connection, or
a Near-Field Communication (NFC) connection, or
any combination thereof.

6. The method of claim 1, wherein the second communication link comprises an OSI model layer 3 or greater.

7. The method of claim 1, wherein the first communication link comprises an OSI model layer 2.

8. An electronic device comprising:
a communication interface;
a memory; and
a processing unit communicatively coupled with the communication interface and the memory, the processing unit configured to cause the electronic device to:
establish, via the communication interface, a first communication link with a destination node, wherein the first communication link comprises a first Open Systems Interconnection (OSI) model layer;
while the first communication link with the destination node is established, send a request to an origination node via the communication interface, wherein:
the request is for information to provide to the destination node, and
the request is sent via a second communication link comprising a second OSI model layer different from the first OSI model layer;
receive, via the second communication link, a message to provide to the destination node; and
send the message from the electronic device to the destination node via the first communication link while the first communication link is established.

9. The electronic device of claim 8, wherein the processing unit is further configured to cause the electronic device to:
maintain a session timer for the first communication link; and
send, via the communication interface, a communication to the destination node before the session timer indicates a threshold period of inactivity.

10. The electronic device of claim 9, wherein the processing unit is further configured to cause the electronic device to include, in the communication a message to:
read from a property of the destination node,
write to a property of the destination node,
or both.

11. The electronic device of claim 8, wherein the processing unit is further configured to cause the electronic device to establish the second communication link by establishing a Transmission Control Protocol (TCP) connection.

12. The electronic device of claim 8, wherein the processing unit is further configured to cause the electronic device to establish the first communication link by establishing:
a BLUETOOTH connection,
a BLUETOOTH Low Energy (BLE) connection,
an LTE-D connection, a ZIGBEE connection,
an IEEE 802.15.4 connection,
an IEEE 802.11 connection, or
a Near-Field Communication (NFC) connection, or
any combination thereof.

13. The electronic device of claim 8, wherein the second communication link comprises an OSI model layer 3 or greater.

14. The electronic device of claim 8, wherein the first communication link comprises an OSI model layer 2.

15. An apparatus comprising:
means for establishing, by an intermediate node, a first communication link with a destination node, wherein the first communication link comprises a first Open Systems Interconnection (OSI) model layer;
means for, while the first communication link with the destination node is established, sending a request from the intermediate node to an origination node, wherein:
the request is for information to provide to the destination node, and
the request is sent via a second communication link comprising a second OSI model layer different from the first OSI model layer;
means for receiving, via the second communication link, a message to provide to the destination node; and
means for sending the message from the intermediate node to the destination node via the first communication link while the first communication link is established.

16. The apparatus of claim 15, further comprising:
means for maintaining a session timer for the first communication link; and
means for sending a communication from the intermediate node to the destination node before the session timer indicates a threshold period of inactivity.

17. The apparatus of claim 16, wherein the means for sending the communication from the intermediate node comprises means for including, in the communication, a message to:
read from a property of the destination node,
write to a property of the destination node,
or both.

18. The apparatus of claim 15, further comprising means for establishing the second communication link using a Transmission Control Protocol (TCP) connection.

19. The apparatus of claim 15, wherein the means for establishing first communication link comprises means for establishing:
a BLUETOOTH connection,
a BLUETOOTH Low Energy (BLE) connection,
an LTE-D connection,
a ZIGBEE connection,
an IEEE 802.15.4 connection,
an IEEE 802.11 connection, or
a Near-Field Communication (NFC) connection, or
any combination thereof.

20. The apparatus of claim 15, wherein the second communication link comprises an OSI model layer 3 or greater.

21. The apparatus of claim 15, wherein the first communication link comprises an OSI model layer 2.

22. A non-transitory computer-readable medium having instructions embedded therein for operating an intermediate node in a distributed store-and-forward system, the instructions comprising computer code for:
establishing, by the intermediate node, a first communication link with a destination node, wherein the first communication link comprises a first Open Systems Interconnection (OSI) model layer;
while the first communication link with the destination node is established, sending a request from the intermediate node to an origination node, wherein:
the request is for information to provide to the destination node, and
the request is sent via a second communication link comprising a second OSI model layer different from the first OSI model layer;
receiving, via the second communication link, a message to provide to the destination node; and
sending the message from the intermediate node to the destination node via the first communication link while the first communication link is established.

23. The non-transitory computer-readable medium of claim 22, wherein the instructions further comprise computer code for:
maintaining a session timer for the first communication link; and
sending a communication from the intermediate node to the destination node before the session timer indicates a threshold period of inactivity.

24. The non-transitory computer-readable medium of claim 23, wherein the instructions further comprise computer code for including, in the communication, a message to:
read from a property of the destination node,
write to a property of the destination node,
or both.

25. The non-transitory computer-readable medium of claim 22, wherein the instructions further comprise computer code for establishing the second communication link using Transmission Control Protocol (TCP) connection.

26. The non-transitory computer-readable medium of claim 22, wherein the instructions further comprise computer code for establishing first communication link using:
a BLUETOOTH connection,
a BLUETOOTH Low Energy (BLE) connection,
an LTE-D connection,
a ZIGBEE connection,
an IEEE 802.15.4 connection,
an IEEE 802.11 connection, or
a Near-Field Communication (NFC) connection, or
any combination thereof.

27. The non-transitory computer-readable medium of claim 22, wherein the second communication link comprises an OSI model layer 3 or greater.

28. The non-transitory computer-readable medium of claim 22, wherein the first communication link comprises an OSI model layer 2.

* * * * *